No. 711,155.  
L. GATHMANN.  
APPARATUS FOR PURIFYING WATER.  
(Application filed Jan. 8, 1900.)  
(No Model.)  
Patented Oct. 14, 1902.
3 Sheets—Sheet 1.
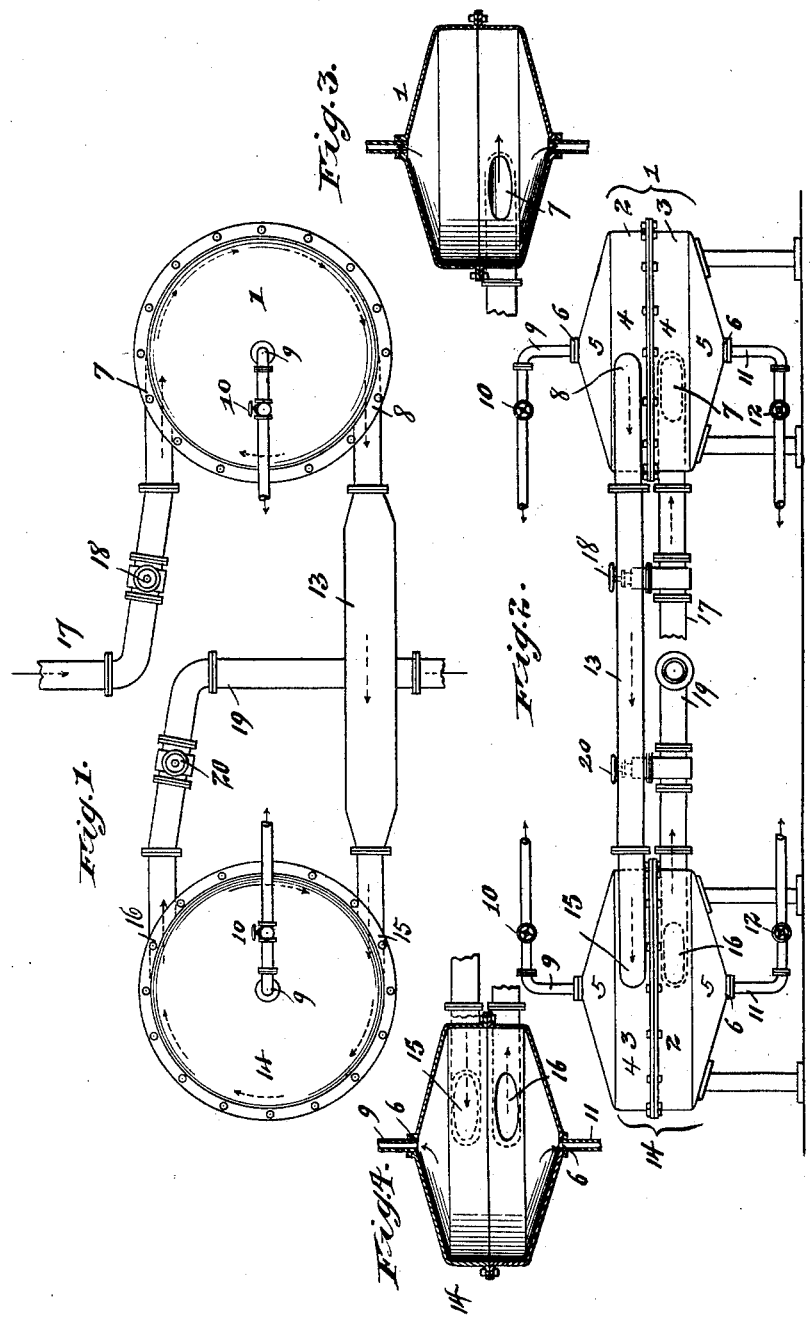

No. 711,155. Patented Oct. 14, 1902.
L. GATHMANN.
APPARATUS FOR PURIFYING WATER.
(Application filed Jan. 8, 1900.)
(No Model.) 3 Sheets—Sheet 2.
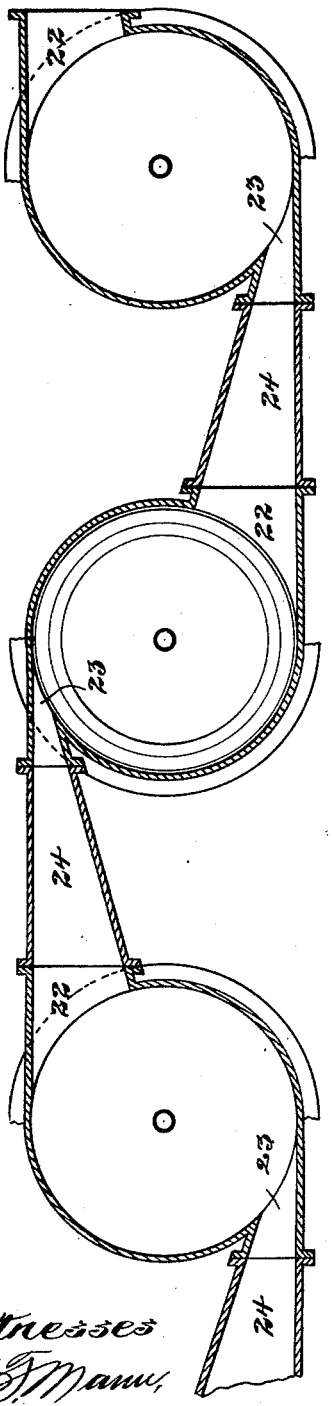
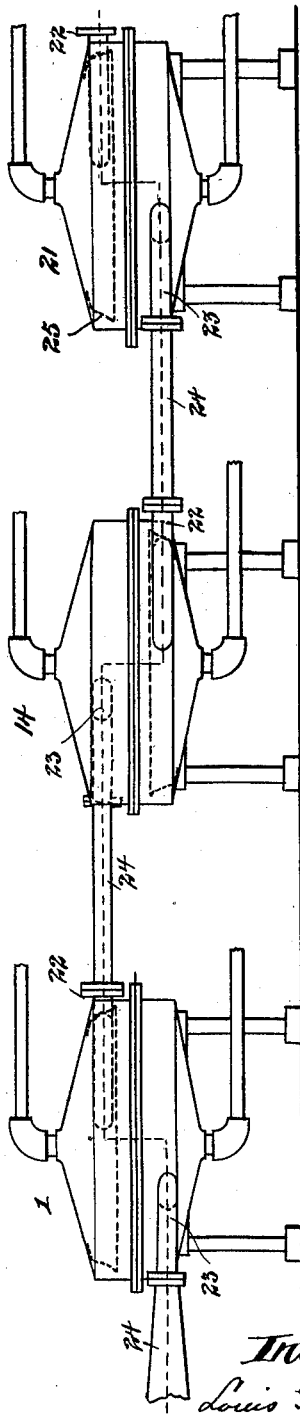

No. 711,155. Patented Oct. 14, 1902.
L. GATHMANN.
APPARATUS FOR PURIFYING WATER.
(Application filed Jan. 8, 1900.)
(No Model.) 3 Sheets—Sheet 3.
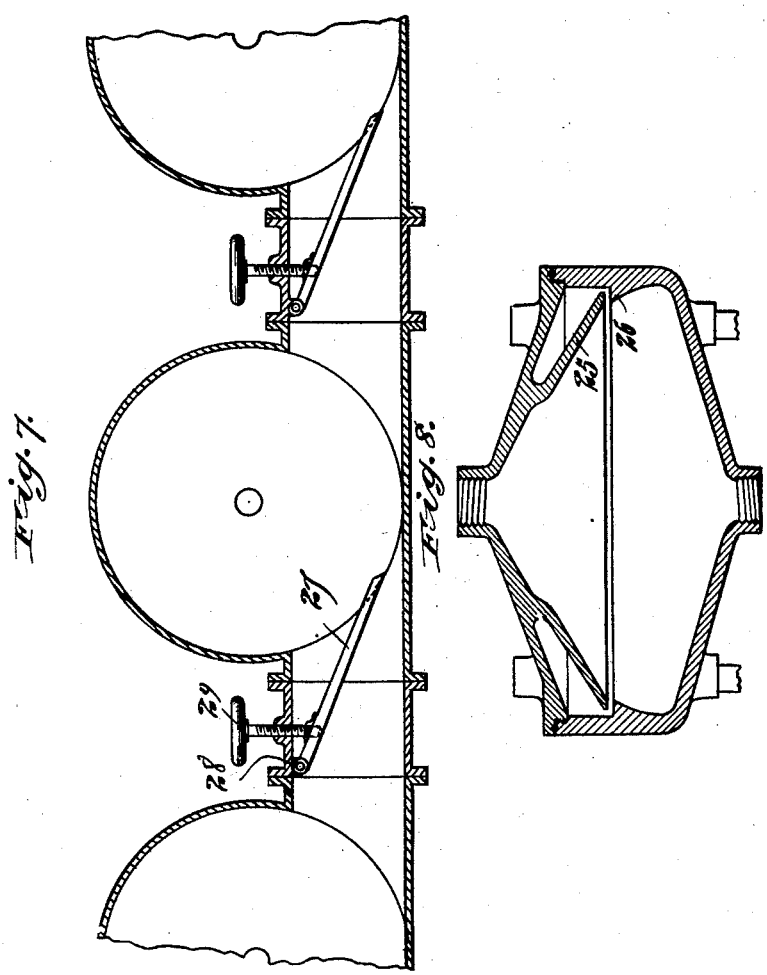
Witnesses,
Inventor,
Louis Gathmann,
By Offield, Towle & Linthicum,
Att'ys

UNITED STATES PATENT OFFICE.

LOUIS GATHMANN, OF WASHINGTON, DISTRICT OF COLUMBIA.

APPARATUS FOR PURIFYING WATER.

SPECIFICATION forming part of Letters Patent No. 711,155, dated October 14, 1902.

Application filed January 8, 1900. Serial No. 771. (No model.)

*To all whom it may concern:*

Be it known that I, LOUIS GATHMANN, a citizen of the United States, residing at Washington, in the District of Columbia, have invented certain new and useful Improvements in Apparatus for Purifying Water, of which the following is a specification.

This invention relates to apparatus for purifying water, and more particularly to an apparatus by means of which the improvements in the art of purifying water set forth in an application filed by me September 16, 1899, Serial No. 730,723, patented October 23, 1900, No. 660,214, may be advantageously carried out.

The object of my invention is to provide a structure which is simple, compact, and inexpensive and adapted to be used in connection with a closed pressure system, by means of which water may be rapidly and economically purified.

To these ends my invention consists in certain novel features which I will now proceed to describe and will then particularly point out in the claims.

In the accompanying drawings, Figure 1 is a plan view of an apparatus embodying my invention in one form. Fig. 2 is an elevation of the same. Fig. 3 is a vertical sectional view of the primary separating-chamber of the structure shown in Figs. 1 and 2. Fig. 4 is a similar view of the secondary separating-chamber. Fig. 5 is an elevation of an apparatus embodying my invention in a modified form. Fig. 6 is a plan sectional view of the same. Fig. 7 is a view similar to Fig. 6, illustrating a further modification; and Fig. 8 is a vertical sectional view of a modified form of separating-chamber.

The improvement designed to be carried out by my present apparatus is one in which the impurities are removed from the water by passing the water through a closed chamber, whereby a vertical action is developed therein, the impurities being separated therefrom and drawn off from the axis of the vortex, while the purified water escapes from the periphery thereof. This treatment may be repeated as many times as necessary to accomplish the purification of the water, and in the apparatus shown in Figs. 1 to 4 of the drawings I have shown a structure in which the water may be first treated in a primary separating-chamber and then subsequently treated in a secondary separating-chamber. In said apparatus, 1 indicates the chamber in which the primary separation is effected, said chamber consisting, preferably, of two similar vessels 2 and 3, each of which may be cast integral or in sections. Each of said vessels has a cylindrical body portion 4 and a frusto-conical top or bottom 5, terminating at its apex in a discharge-orifice 6. In the cylindrical wall of the primary separating-chamber is a tangential inlet, (indicated at 7,) which, as shown in Figs. 1, 2, and 3, is in communication with the lowermost vessel 3, said vessel being placed in such a position that its axis is vertical. The upper vessel 2 has a tangential peripheral discharge 8, which is located at a point about diametrically opposite the inlet-opening 7. To the axial discharge-outlet 6 of the vessel 2 is connected a valve-controlled discharge-pipe 9, the valve being indicated at 10, while the axial discharge-outlet 6 of the lower vessel 3 is provided with a similar discharge-pipe 11, controlled by a valve 12. The discharge-outlet 8 of the chamber 1 is connected, by means of a pipe 13, with a second centrifugal chamber 14, said pipe 13 being preferably enlarged as to its main portion, so as to offer as little resistance as possible to the flow of the water, while its ends are contracted to form nozzles, which tend to give an increased velocity to the water as it passes from said pipe into the second separating-chamber. This secondary chamber is constructed in a manner similar to the primary separating-chamber first described, but differs therefrom in that the position of the vessels 2 and 3 is reversed, and in order to indicate such reversal I have designated them by the same reference-numerals, but have marked the inlet and outlet with new reference-numerals. The tangential inlet in the case of the secondary separating-chamber is indicated at 15 and opens through the cylindrical body-wall of the upper vessel 3, while the outlet-opening, which is indicated at 16, is formed through the cylindrical body-wall of the lower section 2 of the vessel. Axial outlets for the separated impurities are applied to the secondary chamber in the same manner and with the same connections as in the case of the primary separators.

The purpose of constructing the separators in the manner above described is to reduce cost and permit their reversal, for it will be seen that the vessels 2 and 3 are in each case identical in construction and are merely reversed as to position.

The water is supplied to the apparatus through a pipe 17, provided with a controlling-valve 18, and is discharged through a pipe 19, provided with a controlling-valve 20. Assuming that the pipe 17 is connected to a water-main or to a branch or by-pass thereof and that water is being forced through said main either by pumps or by static pressure, the water on entering the separating vessel 1 through the tangential inlet 7 will be delivered against the cylindrical portion to the vessel 2 and will form into a rotary current whose speed will be proportional to the pressure and the rate of consumption. Water being a dense and practically inelastic body, with a specific gravity higher than the impurities carried thereby, when delivered under pressure into a chamber of the form described will form a dense and practically impenetrable moving mass against the peripheral wall of such chamber. The impurities, whether organic or inorganic and whether such as pebbles, sand, silt, or other clayey or earthy material, or vegetable or animal remains, will tend toward the zone of least resistance. The heavier impurities—such as sand, pebbles, or other earthy or mineral matters—will, obeying the law of gravity, seek the lower portion of the separator and will find exit through the bottom discharge-orifice. Other impurities, having a less specific gravity than water and partaking of the rotary motion of the mass, will also seek the interior of the whirling body, being the zone of least resistance, but will pursue an upward trend and escape through the upper discharge-orifice. The purified water is preferably removed or allowed to escape at a peripheral outlet, such as the outlet 8, arranged at a point in the wall of the separator distant from the inlet and at a higher level. As shown at the right hand of Figs. 1 and 2, the outlet is arranged at a point approximately diametrically opposite the inlet and in a plane parallel to or above the outlet. By reason of this arrangement the current of liquid will perform one or more complete revolutions within the separator before reaching the outlet and will issue therefrom purified of all the heavier impurities and in such condition would commonly be considered potable. It may occur, however, that some of the impurities, and particularly the lighter ones, carried by the water will not be separated by the primary treatment. To remove all such impurities, I propose to treat the current of water to a second centrifugal action in the second centrifugal separator 14, which, as already described, is connected to the outlet of the first separator 1. The current enters the second chamber tangentially and preferably in the upper portion thereof, being withdrawn at a lower level. As the impurities reaching this chamber will probably be of a light flocculent nature, they will readily pass out through the upper exit in comparatively close proximity to the point of admission. Any heavy particles having a normal specific gravity greater than water will seek the lower portion of the separator and find exit through the bottom outlet. The now thoroughly-purified water will issue from the outlet 16 in the lower portion of the side of the second separator and may be delivered through the pipe 19 if the system be applied to a large plant, or if to a small plant may be drawn off directly for consumption.

In case the two treatments just described are insufficient to satisfactorily purify the water I may repeat such treatments any desired number of times, and in Figs. 5 and 6 of the drawings I have shown an apparatus comprising a battery of three separators, which number may be increased as desired. In this construction the arrangement of the first and second separators 1 and 14 is similar to that already described, the admission being into the lower part of the first and into the upper part of the second, while the discharge is from the upper part of the first and from the lower part of the second. The third separator, which is indicated by the reference-numeral 21, has the main water-inlet in its lower portion, while the purified water is distributed from the upper portion of its cylindrical body. The same reversal of connections may be made in case successive separating-chambers are added. In this connection I have also shown the pipes by which the water is conducted to the inlet of each chamber as being of contracting diameter toward their discharge ends, so as to form a nozzle, which will give a jet-like delivery into the separating-chamber and a consequent increase in the speed of rotation of the water. In this construction the outlets, which are indicated at 22, are much greater in size than the inlets, which are indicated at 23, and the inflowing-conduit, which is indicated at 24, is of a correspondingly-decreasing diameter from the outlet to the inlet. I have also indicated in Fig. 5 in dotted lines a deflecting-plate 25, located within the chamber at the height of the discharge-outlet, having its inner edge secured to the wall of the chamber, while its outer or free edge terminates in the near vicinity of or a slight distance away from the cylindrical side wall of the chamber. Such a plate tends to permit only that portion of the water which is nearest to the cylindrical wall of the chamber and which is consequently the purest to have access to the outlet through which the purified water is to be discharged and serves to deflect the impurities toward the central portion of the separator. In Fig. 8 of the drawings I have shown a sectional view of a separator having such a plate, which in this instance is cast integral with the frusto-conical wall of the chamber, while the vertical cylindrical wall of the chamber is provided immediately below the margin of the plate 25 with an annular projection 26, which extends below the same, with its inner exposed surface curved, as shown, to further tend to deflect the impurities toward the center of the separator and prevent their access to the discharge-outlet for the pure water.

The particular construction of separators shown in Fig. 8 is one adapted for use where the device is to be made of cast metal and will be readily understood without detailed description.

In Fig. 7 of the drawings I have shown a construction in which the velocity of the discharge of the water into the separating-chambers may be regulated by varying the size of the inlet-openings. In this construction each inlet-pipe is provided with a valve 27, hinged at one edge to the side of the inlet-conduit, as indicated at 28. The free end of this valve is adapted to be projected across the inlet to a greater or less extent by means of an adjusting-screw 29, accessible from the exterior of the apparatus, so that by increasing or diminishing the size of the inlet-opening the velocity of the entering water may be diminished or increased. The angular position of the valve relative to the conduit gives a nozzle-like effect, which produces the jet-like entrance hereinbefore referred to.

I will now call attention to and emphasize some of the features of my invention which have only been referred to incidentally.

In the first place I may remark that my apparatus is intended to operate in conjunction with a flowing current of water the movement of which may be produced by pressure or by suction. When operating by pressure, the latter may be produced by pumps or it may be static pressure. When the static pressure is low, it may be supplemented by pumps to either force or suck the water through the separators.

I may further remark that the pressures necessary to produce a proper distribution of the water will be adequate to the operation of my apparatus, which will not materially lower such pressure. The main diminution of pressure will be due to the lengthening of the path of the current of water and to the small loss occasioned by drawing off the impurities. The pipes through which the impurities are withdrawn are provided with valves, and I contemplate leaving these discharge-pipes open, so as to permit of the constant escape of a small stream of water, so as to carry off the impurities. This loss will not be excessive and will depend as to volume upon the quantity of impurities to be carried away. Instead of the open discharge for the impurities sediment or settling chambers may be used connected to the discharge-outlets and the sediment removed periodically without wasting water or diminishing its pressure.

My apparatus, it will be observed, is a closed pressure apparatus and is to be distinguished from those apparatus, such as filters, in which gravity alone is operative. In my apparatus the elemental action of centrifugal force is the essential and leading characteristic, and this force is or may be developed by the distributing pressure alone and without the use of apparatus having movable parts and also with the simplest form of apparatus, eschewing deflectors, shelves, agitators, or other mechanical appliances, save only a modification of the form and connection of the water-passages sufficient to produce a rotary or gyratory movement of the water developing centrifugal force.

My apparatus constitutes practically an integral or continuous part of a water-main, is automatically operated as an apparatus, and requires but very slight supervision or attendance.

The form, materials of construction, and arrangement and combinations of parts are obviously capable of almost indefinite variations to adapt them to the multitude of situations in which the invention may be applied. The apparatus is capable of great variation as to size and material and operates upon the same principle whether applied to a service-pipe at the end of a system of water distribution or to the main at the inlet end of such system.

I make no claim in this present application to the improved process or method herein set forth *per se*, as the same forms the subject-matter of a separate application filed by me September 16, 1899, Serial No. 730,723.

I claim—

1. An apparatus for purifying water, comprising a closed separating-chamber having a curved side wall and tapered top and bottom walls, a single tangential inlet for the water to be purified, a normally open peripheral outlet for the purified water, axial outlets for the separated impurities, at both top and bottom and means for maintaining said chamber full of circulating water; substantially as described.

2. An apparatus for purifying water, consisting of a closed separating-chamber having a circular side wall provided with a tangential inlet located in one horizontal plane and a peripheral outlet, located at a different horizontal plane, axial outlets for the separated impurities at top and bottom and means for maintaining said chamber full of circulating water, substantially as described.

3. A water-purifier consisting of a closed separating-chamber composed of two similar sections, each having a cylindrical side wall and a tapering end wall, and each of said sections provided in its cylindrical portion with a tangentially-arranged opening and with an outlet in its tapering portion, said sections being separable in a plane between said tangential openings; substantially as described.

4. An apparatus for purifying water comprising a series of closed connected separating-chambers, each having curved side walls, a tangential inlet, a peripheral outlet for the purified water, and axial outlets at top and bottom for the separated impurities, the inlets of the successive chambers being arranged on opposite sides, substantially as described.

5. An apparatus for purifying water comprising a plurality of separating-chambers, each having curved side walls, a tangential inlet, and a peripheral outlet, the inlet and outlet being arranged in different planes, and axial outlets for the separated impurities, the inlets of the successive chambers being arranged on opposite sides and successively-different planes, substantially as described.

6. An apparatus for purifying water comprising a separating-chamber having a circular side wall provided with a tangential inlet, and a peripheral outlet, an axial outlet for the separated impurities, and a deflecting-plate connected with the body of the chamber between the pure-water outlet and the outlet for the impurities and having its free margin located adjacent to the circular wall of the chamber in a plane between the main inlet and outlet, substantially as described.

7. An apparatus for purifying water comprising a separating-chamber having a circular side wall provided with a tangential inlet, and a peripheral outlet, an axial outlet for the separated impurities and a deflecting-plate connected with the body of the chamber between the pure-water outlet and the outlet for the impurities and having its free margin located adjacent to the circular wall of the chamber in a plane between the main inlet and outlet, the circular wall of the chamber being provided with an inwardly-extending deflecting projection adjacent to said free edge, substantially as described.

8. An apparatus for purifying water comprising a separating-chamber having a circular side wall provided with a tangential inlet, a peripheral outlet for the purified water, and an axial outlet for the separated impurities, said inlet having a diagonally-arranged adjustable valve, whereby the velocity of the entering water may be regulated, substantially as described.

LOUIS GATHMANN.

Witnesses:
IRVINE MILLER,
L. F. MCCREA.